United States Patent [19]

Kristiansen

[11] E Re. 30,565

[45] Reissued Apr. 7, 1981

[54] INTERNAL COMBUSTION ENGINE AND OPERATING CYCLE

[75] Inventor: Haaken H. Kristiansen, Winnipeg, Canada

[73] Assignee: Kristiansen Cycle Engines Ltd., Winnipeg, Canada

[21] Appl. No.: 23,764

[22] Filed: Mar. 26, 1979

Related U.S. Patent Documents

Reissue of:

[64] Patent No.: 4,022,167
Issued: May 10, 1977
Appl. No.: 546,909
Filed: Feb. 4, 1975

U.S. Applications:

[63] Continuation-in-part of Ser. No. 433,237, Jan. 14, 1974, abandoned.

[51] Int. Cl.[3] ..... F02B 57/00

[52] U.S. Cl. ..... 123/43 AA

[58] Field of Search ..... 123/43 A, 43 AA, 58 A, 123/58 AA, 58 AM, 58 B, 90.15

[56] References Cited

U.S. PATENT DOCUMENTS

| | | | |
|---|---|---|---|
| 927,297 | 7/1909 | Tuckfield | 123/90.15 X |
| 1,181,463 | 5/1916 | La Fontaine | 123/58 AA UX |
| 1,255,664 | 2/1918 | Syger | 123/43 AA |
| 1,389,873 | 9/1921 | Hult | 123/43 AA |
| 1,569,525 | 1/1926 | Owens | 123/43 AA |
| 1,628,100 | 5/1927 | Bacon | 123/43 AA |
| 1,666,539 | 4/1928 | Michell | 123/58 AA |
| 1,793,107 | 2/1931 | Livingston | 123/58 AA X |
| 2,556,585 | 6/1951 | Jarvinen | 123/43 A |
| 2,783,751 | 3/1957 | Karlan | 123/58 AA |
| 3,456,630 | 7/1969 | Karlan | 123/58 AM |

FOREIGN PATENT DOCUMENTS

| | | | |
|---|---|---|---|
| 879624 | 6/1953 | Fed. Rep. of Germany | 123/58 AM |

*Primary Examiner*—Michael Koczo, Jr.
*Attorney, Agent, or Firm*—Breneman, Kane & Georges

[57] ABSTRACT

A [pair of] cylindrical [rotors are] *rotor is* mounted for rotation within a stator and [each rotor including] *the rotor includes* a plurality of cylindrical bores annularly around the axis thereof and parallel to the stator bore. Pistons reciprocate within these bores and connecting rods or links of the pistons engage within the profile of a [pair of annular cams] *an annular cam* secured to the stator [at opposite ends thereof] so that as the [rotors rotate,] *rotor rotates,* the pistons reciprocate due to the cam profile. By providing a set of pistons and cylinders, on each side of a central common cylinder head at each end, a pair of rotors and a pair of cams one at each end of the stator, balance is achieved. A common combustion chamber is provided in the cylinder head for the pistons on the opposite sides of the cylinder head. The cycle can be of a diesel type with a fuel injection or of the gasoline/air mixture type with conventional spark plugs. Of importance, is the ease with which the expansion ratio can be made greater than the compression ratio thus utilizing more of the energy normally expelled and wasted in exhaust gases with the conventional cycles. Furthermore, timing is easily adjusted by rotating the cams and the compression ratio can be varied by moving the two cams further apart or closer together.

53 Claims, 9 Drawing Figures

INTERNAL COMBUSTION ENGINE AND OPERATING CYCLE

Matter enclosed in heavy brackets [ ] appears in the original patent but forms no part of this reissue specification; matter printed in italics indicates the additions made by reissue.

BACKGROUND OF THE INVENTION

This invention relates to new and useful improvements in internal combustion engines and constitutes a Continuation-in-Part Application of Ser. No. 433,237, filed Jan. 14, 1974, and now abandoned.

Conventionally, internal combustion engines whether they are of the reciprocating piston type or the rotary type, utilize the Otto cycle or the Diesel cycle or the Dual Combustion Cycle.

All conventional engines suffer from one principal disadvantage, namely, that the expansion stroke is the same length as the compression stroke so that a considerable amount of the energy is wasted and expelled as hot exhaust gases under considerable pressure.

Another disadvantage of conventional engines is that they require a separate combustion chamber for each piston.

SUMMARY OF THE INVENTION

The present invention overcomes these disadvantages by utilizing an improved cycle in which the expansion ratio or stroke is greater than the compression ratio or stroke thereby converting some of the energy normally expelled and wasted in the exhaust gases, to useful work or horsepower.

The greater expansion ratio compared to that of the compression ratio is achieved within one cylinder and piston in contrast to the "Brayton" cycle which although it expands the gases to atmospheric pressure, achieves this with two pistons, one for compression and the other for expansion.

Furthermore, a common mini-combustion chamber is used for each bank of cylinders so that continuous combustion is possible.

An object of the invention is therefore to provide an improved operating cycle for internal combustion engines in which the expansion and exhaust strokes are longer than the intake and compression strokes thereby converting more work to useful energy than in conventional operating cycles.

Another object of the invention is to provide a rotary engine which can be used with a conventional cycle of operation or, can be used with the improved cycle of operation as desired.

Still another object of the invention is to provide a device of the character herewithin described which is readily adaptable for use with a gasoline/air mixture and spark plug or with a diesel fuel injection operation or with a dual combustion type of operation.

Yet another object of the invention is to provide a device of the character herewithin described which, when constructed to operate conventionally, can be used as a two or four-stroke engine.

Yet another object of the invention is to provide a device of the character herewithin described which eliminates many of the moving parts normally associated with reciprocating piston type engines.

A further object of the invention is to provide an engine with a mini combustion chamber common to a plurality of pistons and cylinders so that continuous combustion can take place as the pistons and cylinders rotate past the combustion chamber.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

In the drawings like characters of reference indicate corresponding parts in the different figures.

DETAILED DESCRIPTION

Although the drawings illustrate a novel engine utilizing the new cycle of operation in which the expansion stroke is longer than the compression stroke, nevertheless it will be appreciated that the novel engine can be constructed to operate on a conventional cycle in which the lengths of stroke are equal under which circumstances only one rotor may be utilized. Furthermore, when used with a conventional cycle of operation, the engine is readily adapted for use with either a two or four-stroke cycle.

Also to be appreciated is the fact that the novel cycle described herein can readily be used with other conventional rotary type engines whether these engines are rotary piston type or not.

With a conventional opposing piston engine, a cam-type crank shaft can be utilized so that the expansion stroke is longer than the compression stroke and by modifying the lobe of a rotary engine such as the Wankel, a similar effect can be obtained.

The novel cycle described herein may be defined as a cycle based on the Otto, Diesel or Dual Combustion cycle, but having an expansion ratio greater than the compression ratio, said ratio being less than that required to expand the gases to atmospheric pressure. This cycle is achieved within one cylinder or chamber and is a geometrical and volumetrical ratio in which a motion of a chamber, or cylinder and piston, produces a geometrical ratio which theoretically is the same as the volumetrical ratio. This eliminates dead motion as in the case of some engines which reduce the volumetrical compression ratio in comparison to the geometrical ratio by either early or late intake valve closing.

Figure 8:
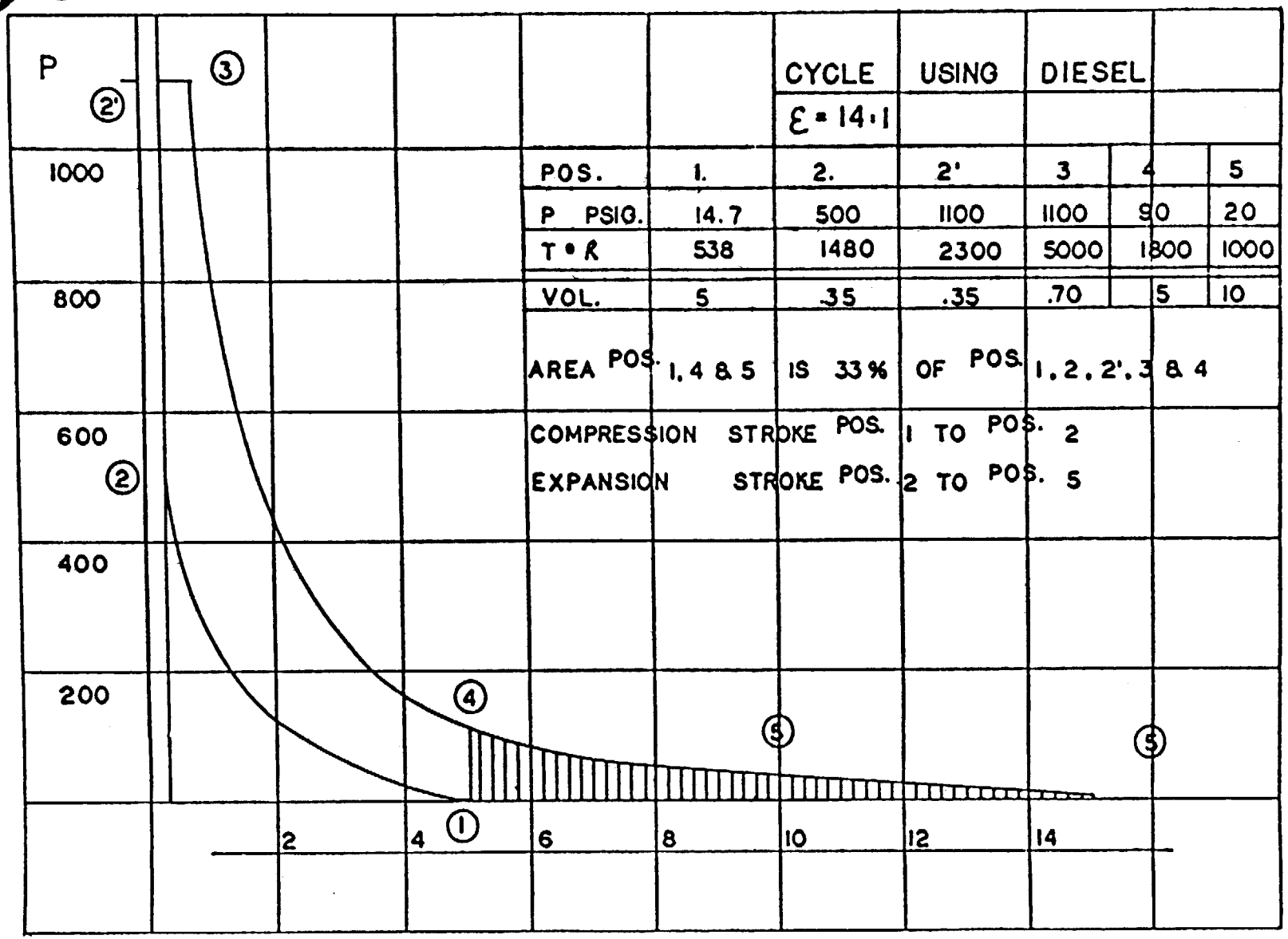
FIG. 8 is a view showing the cycle used with a diesel operation.

Proceeding therefore to describe the invention in detail, reference should first be made to FIG. 8 which shows a pressure diagram for a diesel cycle.

The line between positions 1 and 2 illustrates the compression stroke, and between 2, 3 and 4, the conventional expansion stroke at which time the exhaust valve normally opens.

In the present cycle, the expansion stroke extends from position 2 through 3, 4 and to position 5 thus utilizing more of the power developed by the fuel than heretofore.

Approximately 30% more power can be utilized at all power settings thus increasing the efficiency of the engine whether using carburetor, diesel or dual combustion type cycles of operation.

FIGS. 1 to 7 show one embodiment of a novel engine which may utilize this cycle although of course, it will be appreciated that a conventional cycle can be used.

Proceeding to describe the engine in detail, reference to the accompanying drawings will show a substantially cylindrical stator collectively designated 10 which is provided with a cylindrical chamber 11 formed therethrough.

Each end of this cylindrical chamber is closed by means of a cylinder head 12 secured by bolts 13 with a conventional type seal 14 being provided between the cylinder head 12 and the cylindrical stator 10.

A cylindrical rotor 15 is mounted for rotation within each end of the stator 10 and secured to a common shaft 16 which in turn is bearably supported within bearings 17 provided centrally of each cylinder head 12.

Figure 1:
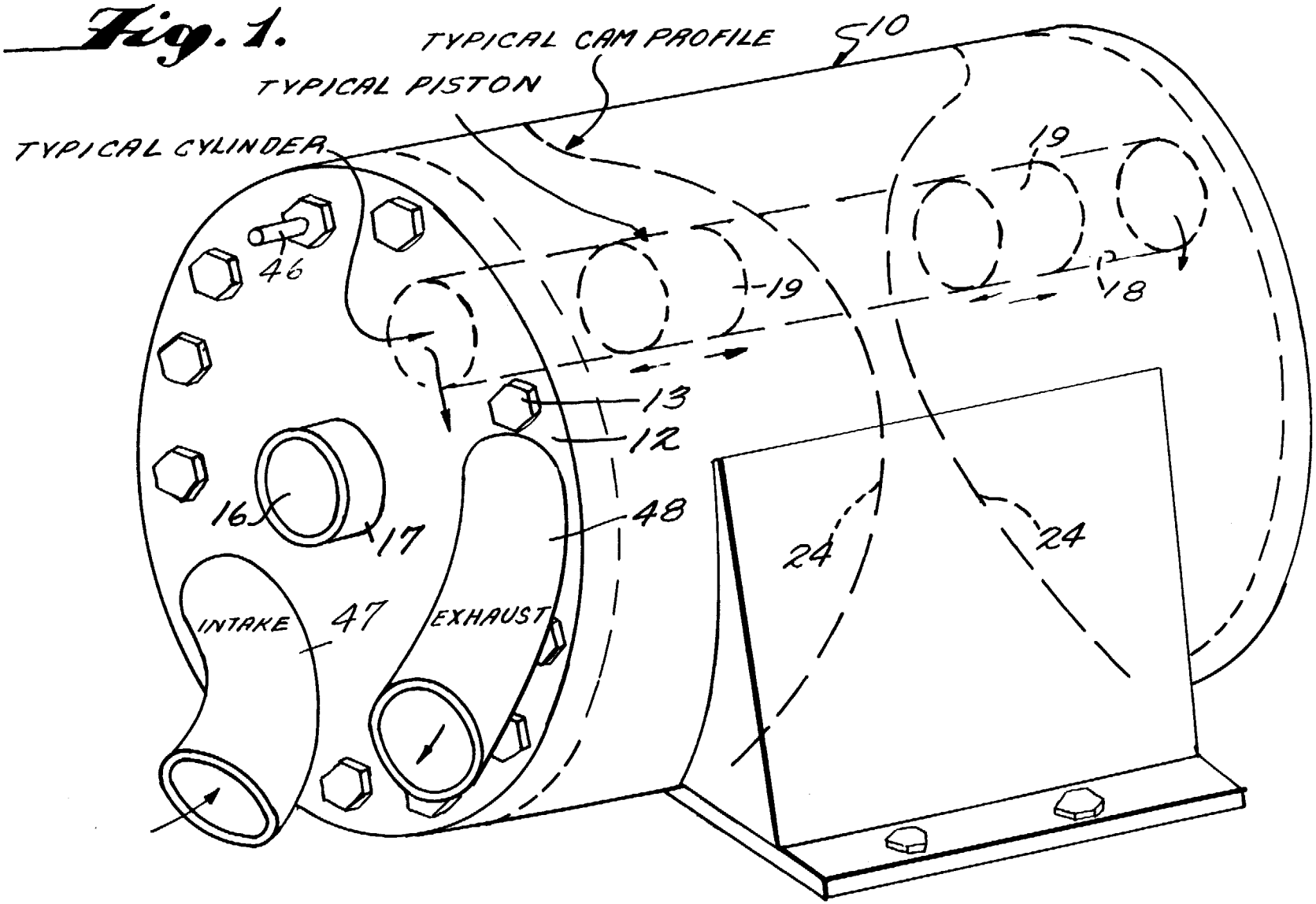
FIG. 1 is an isometric partially schematic view of one embodiment of the engine.
Figure 2:
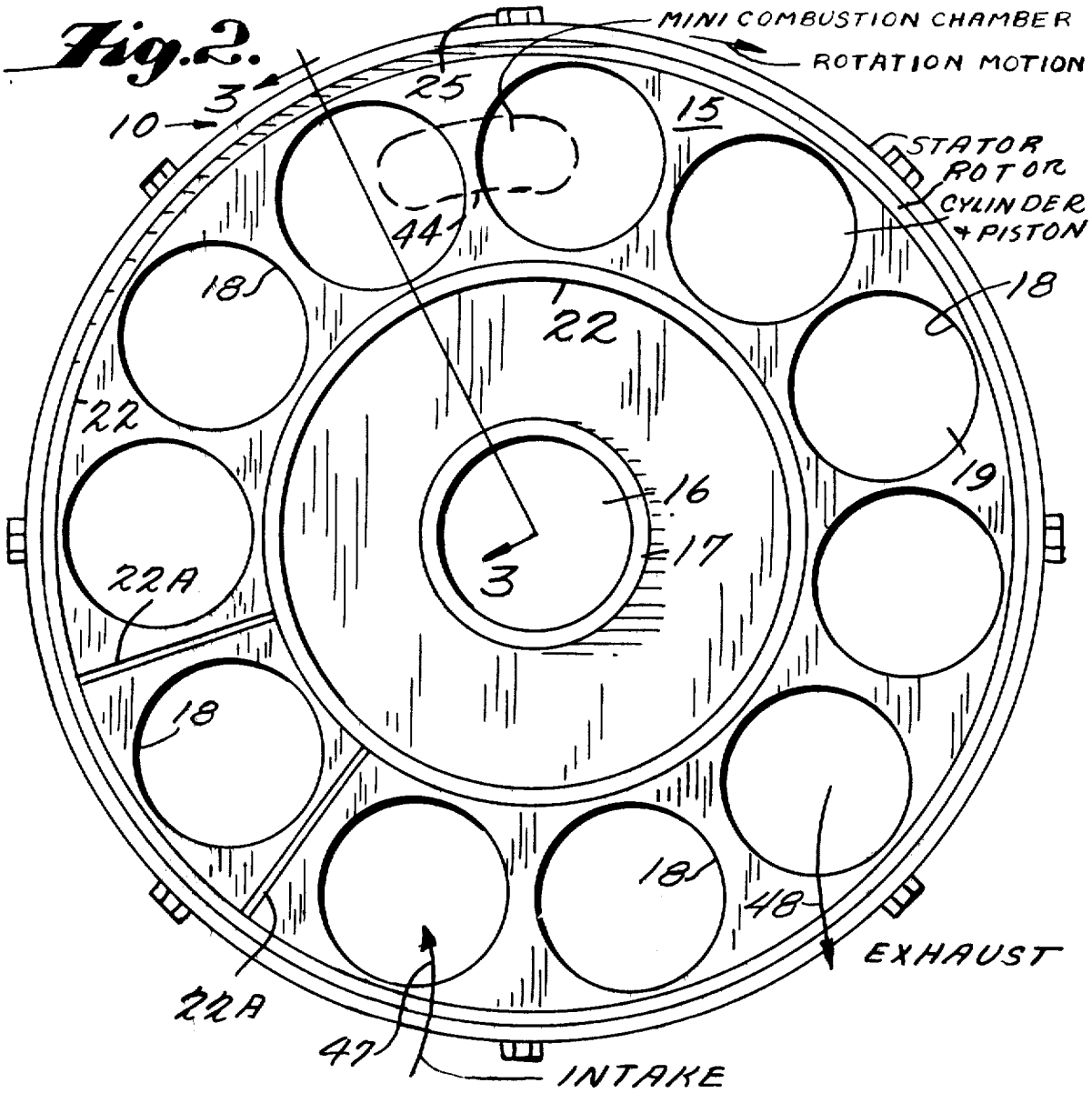
FIG. 2 is a end view of FIG. 1 with one cylinder head removed.

Each rotor 15 is provided with a plurality of piston bores 18 equidistantly spaced around the axis of the rotor in an annular ring as clearly illustrated in FIG. 2 and a piston 19 is provided for each bore and is reciprocated therein, conventional piston rings 20 being provided as shown.

Figure 3:
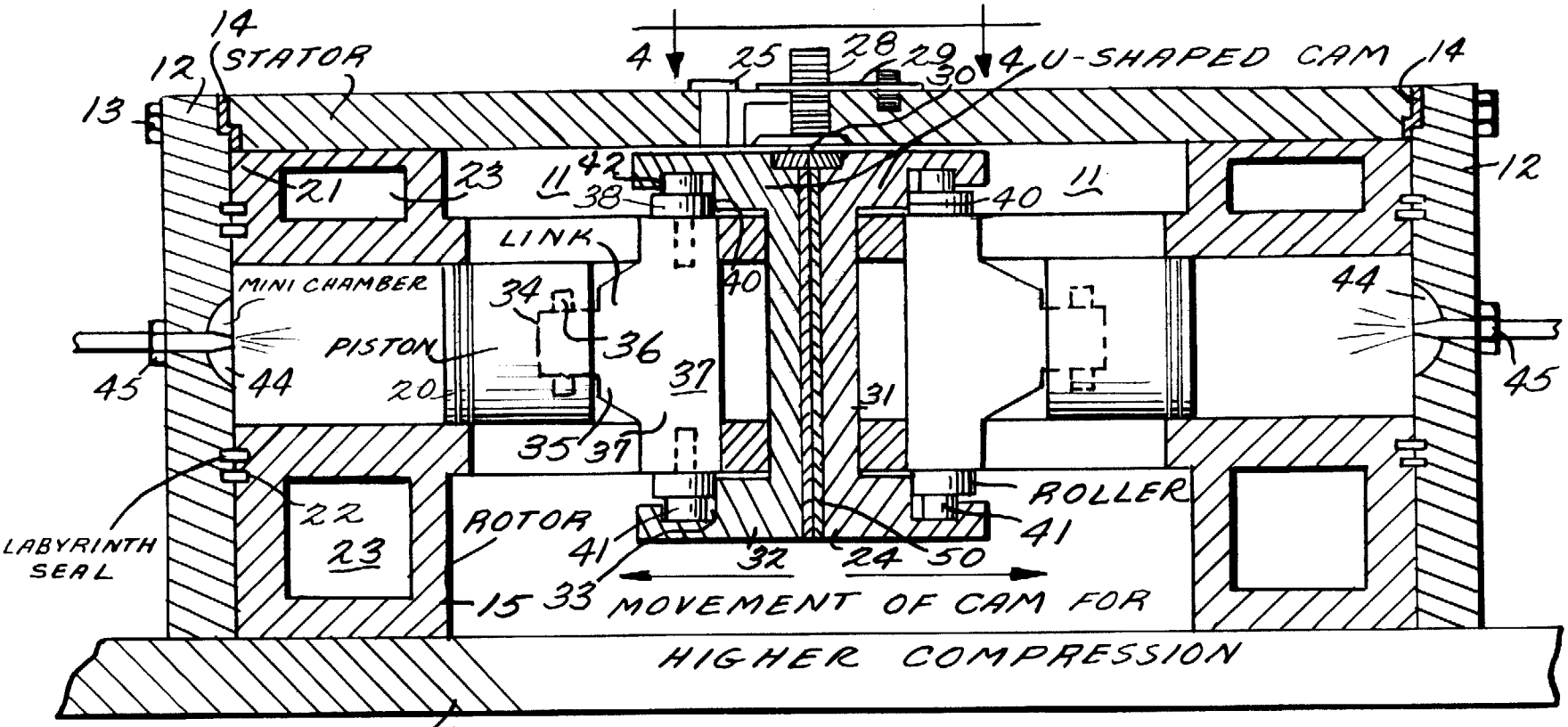
FIG. 3 is a schematic section along the line 3—3 of FIG. 2.
Figure 4:
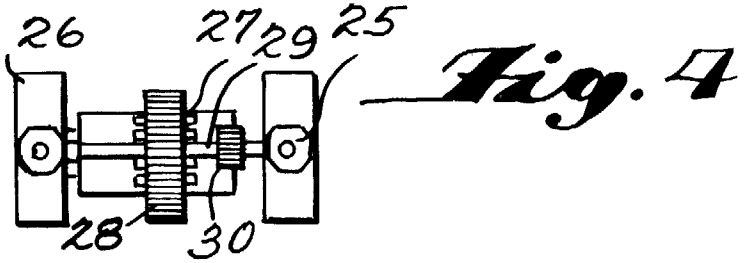
FIG. 4 is an enlarged fragmentary plan view substantially along the line 4—4 of FIG. 3.

The rotors 15 are situated at each end of the stator as hereinbefore described, with the outer ends 21 in bearing contact with the cylinder heads and sealed by means of annular seals 22 which are shown schematically in FIG. 3. However, these seals are preferably labyrinth type seals which are well known so that it is therefore not believed necessary to describe same further. However, optional radial seals 22A may be incorporated between each cylinder (see FIG. 2).

Annularly formed fluid passages 23 may be provided in each of the rotors and connected to an external source for cooling purposes.

A pair of cam rings 24 are provided intermediate the ends of the stator 10 and are secured around the wall of the cylindrical chamber 11 by means of bolts 25 screw threadably engaging the cam rings 24 through elongated slots 26 in the wall of the stator and these stators may be rotated within limits, for purposes hereinafter to be described, by any convenient means. In the present embodiment, such means includes gear teeth 27 formed around part of the outer periphery of the two cam rings 24 engageable by a gear 28 mounted upon a shaft 29 which in turn may be rotated through gear 30 from any convenient location so that rotation of shaft 29 will move the cam rings 24 annularly within limits.

Each cam ring is U-shaped when viewed in cross section and reference should be made to FIG. 3. Each cam ring includes a base 31 with a pair of upstanding legs 32 extending at right angles and each of these legs is provided with an annular channel 33 formed on the inner wall thereof as clearly shown. This annular channel rises and falls axially through 360°, the profile of the channel being shown specifically in FIG. 6 and this channel forms the profile of the two cam rings, one being a mirror image of the other as clearly illustrated in FIG. 6.

Figure 7:
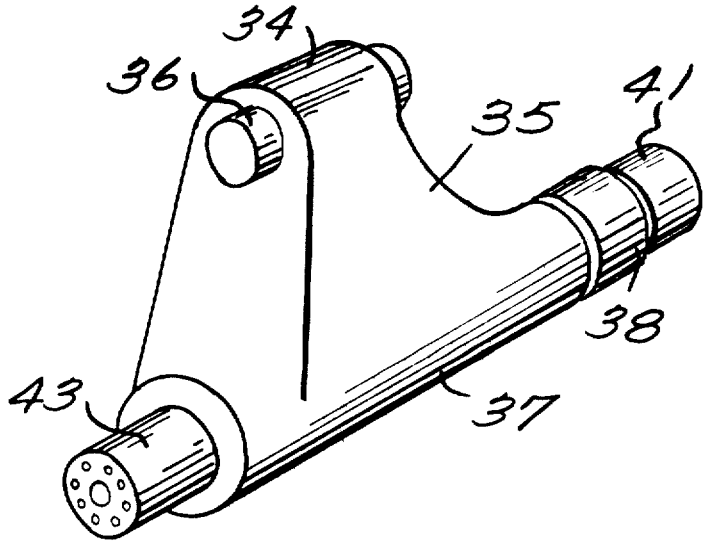
FIG. 7 is an isometric view of one of the connecting rods showing two alternative connections of the rod to the cam ring as illustrated in FIGS. 3 and 5.

Means are provided to connect the pistons 19 with the cam rings, said means taking the form of a connecting rod or link shown specifically in FIG. 7.

The inner end 34 of the connecting rod means 35 is provided with a wrist pin 36 which pivotally connects the inner end to the piston 19 through bosses provided (not illustrated) in the usual manner.

The lower end 37 of the link *or connecting rod means* 35 is wider than the inner end 34 and is provided with rollers upon either side thereof.

FIG. 3 shows one embodiment of these rollers in which a relatively large roller 38 (also shown in FIG. 7) is journalled for rotation upon a pin 39 extending from either end of the portion 37 and these relatively large rollers are in rolling contact with one wall 40 of the annular channel 33.

A smaller roller 41 (also shown in FIG. 7) is also journalled for rotation upon the end of pin 39 and is in contact with the other wall 42 forming the annular channel 33 so that these two rollers anchor the connecting rod means 35 within the profile of the cam ring defined by the annular channel 33.

Figure 5:
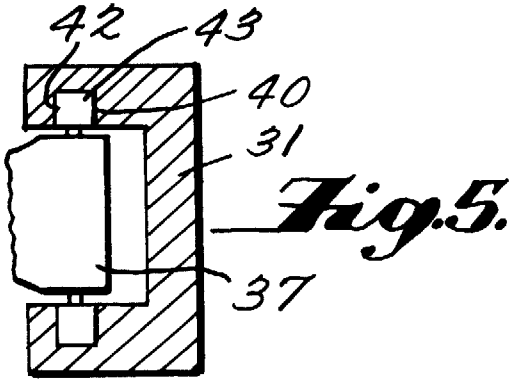
FIG. 5 is a fragmentary view showing an alternative construction of the connection of the piston to the cam ring.

Alternatively, a single relatively wide roller 43 can be journalled for rotation upon the end of pin 39 and engage within a modified channel shown in FIG. 5.

In either embodiment, rotation of the rotor within the stator will cause the rollers on each piston to roll around the cam profile and the shape of this profile causes these pistons to reciprocate within the piston bores 18 in a clearly defined sequence.

Figure 6:
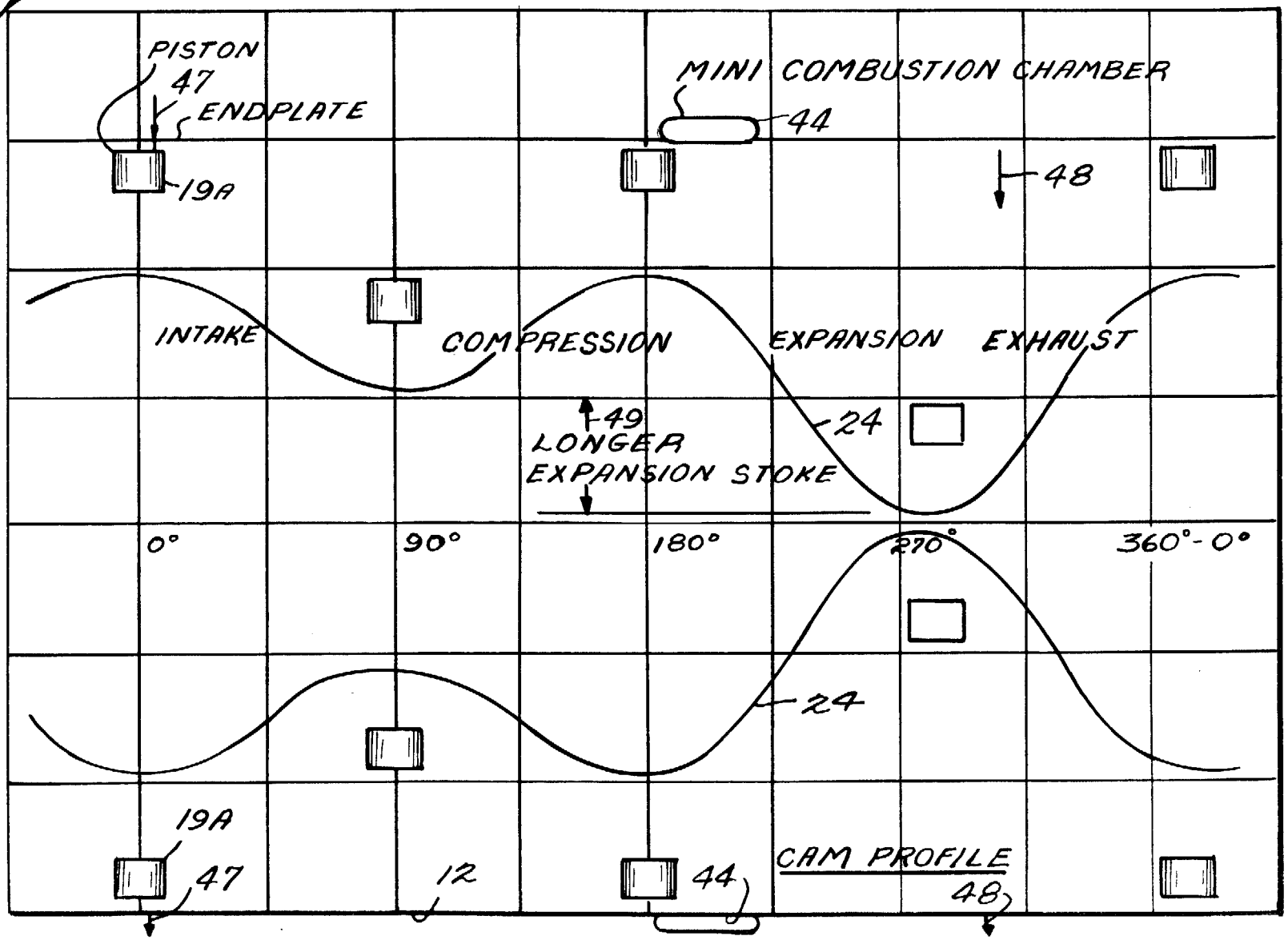
FIG. 6 is a schematic view of the cycle of operation of the engine utilizing the improved cycle.

If the profile of the cam ring is symmetrical then the length of the stroke of the pistons 19 will be the same, but if the profile is modified as illustrated in FIG. 6, then the length of the stroke of the pistons while travelling around one portion of the cam profile will be different from the length of the stroke of the piston travelling around the remainder portion of the profile.

For example, by programming the profile, intake and compression strokes can be initiated by each piston together with expansion and exhaust strokes through one rotation of one piston (360°) and the shape of the profile will cause the intake and compression strokes to be shorter than the expansion and exhaust strokes.

By providing two rotors with two sets of pistons and two cam rings, one being a mirror image of the other, a balance is achieved and vibration is reduced. Two such systems are shown in FIG. 6 schematically.

A relatively small arcuately curved firing chamber 44 is formed in each of the cylinder heads and at this location either a spark plug 45 or a fuel injection nozzle 46 *(FIG. 1)* is provided depending upon the system being used.

An intake port [46] *47* extends through the cylinder head together with an exhaust port 48 and these are shown schematically in FIG. 2 and FIG. 6.

FIG. 6 shows one cycle of two opposed pistons specifically designated 19A in FIG. 6. The cycle extends through 360° or one revolution of the two rotors 15.

At the first position (0°) the pistons are at approximately top dead center and are moving inwardly as they pass the intake conduit *or port* 47. Assuming an engine using a carburetor, the pistons will draw in a gasoline-/air mixture during the intake stroke through approximately 90°.

As the pistons 19A pass or close off the intake ports 47, they commence moving outwardly and compress the gases between the piston head and the cylinder head for a stroke having the same length as the intake stroke. As they reach one end of the small combustion chamber 44, spark plug 45 is fired thus igniting the mixture which causes an expansion stroke and causes the pistons to move inwardly through approximately a further 90°. However, due to the shape of the cam profiles, this expansion stroke is longer than the compression stroke by an amount indicated in FIG. 6 by reference character 49 and as the pistons approach the innermost position at approximately 270°, the exhaust port 48 is reached and the spent gases are expelled through the exhaust port during the exhaust stroke which is the same length as the expansion stroke. Due to the longer expansion and exhaust strokes, these strokes will exceed 90° rotary travel and the intake and compression strokes will be less than 90° rotary travel.

Each succeeding piston follows the same path so that there is a relatively continuous firing and the combustion chamber 44 spans or overlaps two or more cylinders. This serves two purposes. First, to stratify the charge with a carburation type engine and secondly, to assist in continuous burning with the injection type engine. Both systems serve to assist in burning a lean mixture and thereby assist further in meeting present day emission standards.

The thermal efficiency is increased considerably with the novel cycle and the thermal efficiency of conventional cycles is expressed in the formulae:

$$e = 1 - \frac{T4 - T1}{T3 - T2}$$

for Otto and Brayton cycle;

$$e = 1 - \frac{1}{k}\left(\frac{T4 - T1}{T3 - T2}\right)$$

for the Diesel cycle;

$$e = 1 - \frac{T4 - T1}{(T2' - T2) + k(T3 - T2')}$$

for the Dual Combustion Cycle.

In the above formulae,

T1 = Temperature of the intake air

T2 = Temperature of compressed air

T3 = Temperature of the combusted mixture

T2′ = Temperature corresponding to the point in the cycle at which constant pressure combustion commences;

T4 = Temperature of the Exhaust gases

T5 = Temperature of the Exhaust gases in the new cycle.

It is believed that the exhaust temperature with improved cycle is approximately 1,000° R (Rankin) lower than the Otto or Diesel cycle so that by substituting this new figure (T5) for T4 in the above formulae, the thermal efficiency in the new cycle is approximately 30% higher or more.

As mentioned previously, FIG. 6 shows a new cycle in which the expansion exhaust strokes are considerably longer than the intake and compression strokes, but of course it will be appreciated that by shaping the cam profiles, the strokes can be made the same length.

The aforementioned gear 28 may be used to rotate the cams slightly with reference to the position of the combustion chambers 44 thus varying the timing of the ignition or fuel injection.

By the same token, by changing the relationship between the two cams axially, as by inserting or withdrawing shims 50 between the two cams, the compression ratio may be varied within limits.

The preceding description covers the embodiment shown in FIGS. 1 through 5 and FIG. 7, in which the cam rings 24 are situated centrally of the stator 10 and the cylinder heads 12 are situated at each end thereof.

Figure 9:
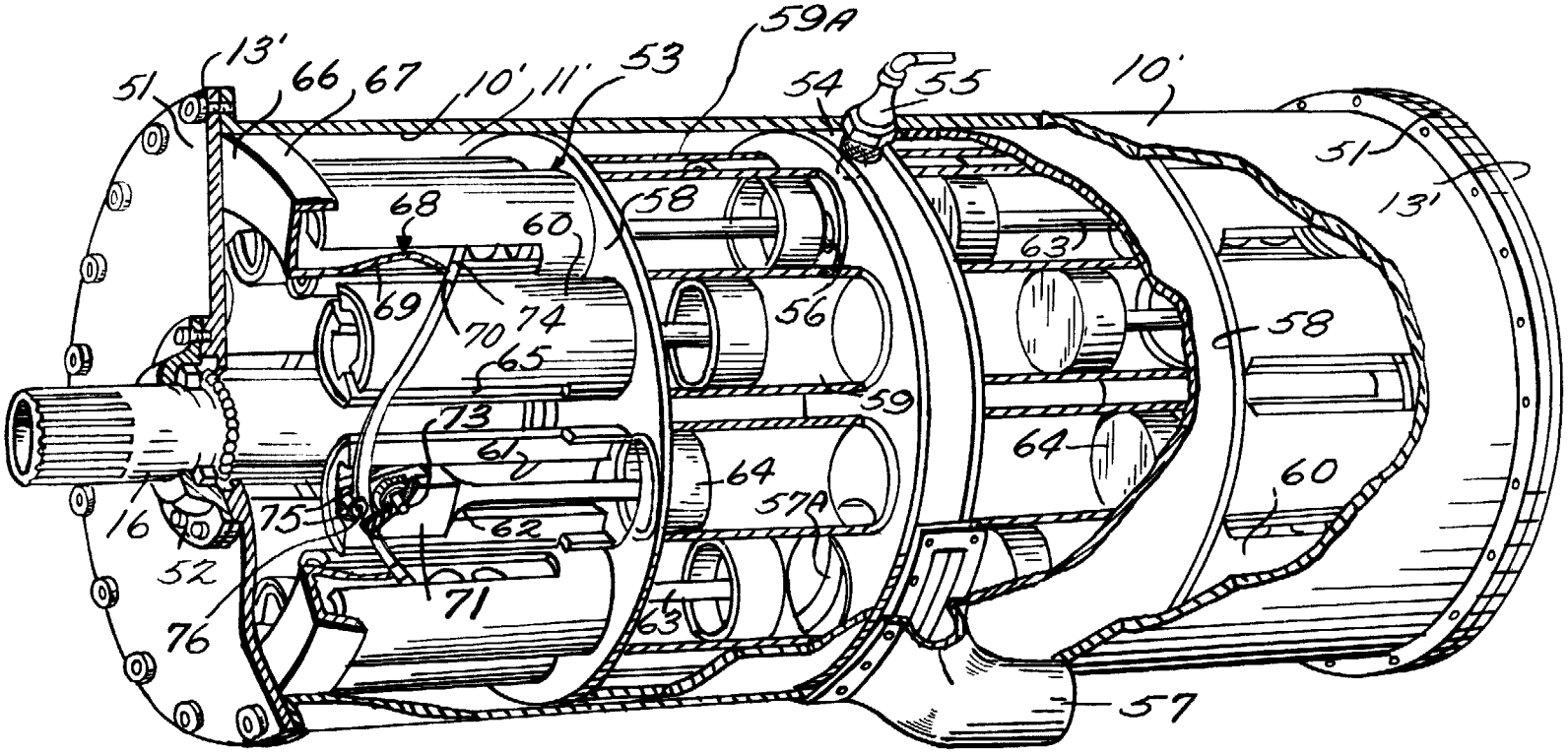
FIG. 9 is an isometric, partially sectioned view of an alternative embodiment of the invention.

However, it will of course be appreciated that the positions of these parts may be reversed with the cam rings situated adjacent the ends of the stator and a common cylinder head being situated intermediate the ends of the stator and such a design is shown in FIG. 9. Where applicable, similar reference characters have been given, but with a prime distinguishing them from the reference characters of the other views.

The cylindrical stator 10′ is provided with a cylindrical chamber 11′ formed thereby.

End plates 51 are secured to each end of this cylindrical stator by means of bolts 13′ and bearing assemblies 52 are provided centrally within the end plates 51 to support for rotation, a common shaft 16′.

A cylindrical rotor collectively designated 53 is secured to shaft 16′ as by splines or the like (not illustrated), there being a pair of rotors provided in this embodiment one upon each side of a common cylinder head 54. This cylinder head is secured within the stator 10′ centrally thereof and spans the cylindrical chamber 11′ as clearly illustrated. It is provided with a spark plug such as indicated by reference character 55 although, if desired, fuel injection means may be provided at this point. The spark plug or fuel injection means communicates with a small combustion chamber 56 formed through the cylinder head 54 so that it communicates with the rotor 53 on either side of the cylinder head.

Exhaust means [56] *57* communicate with a common exhaust port [57] *57A* within the cylinder head 54 and an air intake of air/fuel intake is provided on the opposite side of the cylinder head (not illustrated) similar to the intake 47 of the previous embodiment.

From the foregoing it will be appreciated that the combustion chamber 56 is common to both rotors 53, together with the exhaust and intake port means.

Each rotor 53 is mounted upon shaft 16′ as hereinbefore described and includes a centrally located support plate 58.

Cylinder bores 59 are formed annularly within a block [60] *59A* extending upon one side of plate 58 and being secured thereto and these bores are parallel to the axis of the shaft 16′.

A support cylinder 60 is secured to the other side of plate 58 one each in alignment with the bores 59 and these support cylinders are provided with longitudinally extending channels 61 upon each side thereof within which is supported for reciprocation, a bifurcated end 62 of a connecting rod 63 which extends from the underside of each piston 64 which in turn reciprocates in each of the bores 59. The rod 63 and the piston 64 are preferably formed from one piece and the support cylinders 60 are bifurcated as illustrated at 65 for reasons which will hereinafter be described.

Alternatively, the cylinders and support cylinders 60 may be formed of hollow cylindrical shells clamped between upper and lower plates, but as this is considered to be an obvious alternative, it is not believed necessary to describe same further.

However, it should be observed that the claims are intended to cover both structures.

A cam ring 66 is secured within each end of the stator 10' adjacent the end plates 51 and this cam ring includes the support base portion 67 and a T-shaped portion collectively designated 68. This T-shaped portion includes a web 69 and a flange 70 extending upon each side of the edge of the web as clearly shown in FIG. [10] *9* and the bifurcated formation of the support cylinders 60 permits rotation of the rotor around the cam ring with a portion of the web and the flange 70 being siutated within the bifurcated slots 65.

Means are provided to connect the ends 62 of the connecting rod to the cam rings and in this connection these ends 62 are bifurcated to form two side portions 71 between which is situated a first roller means 72 supported for rotation upon a pin 73 extending between the bifurcated portions 71.

This roller rides upon the outer surface 74 of the flanges 70 as clearly shown.

A pair of smaller rollers 75 are journalled for rotation upon a pin 76 also extending between the sides of the bifurcated ends 71, but being spaced from the main or first roller 72 and each of these small rollers 75 engages the inner surface of the flanges 70, one upon each side of the web 69 thus ensuring that the roller 72 follows the contour of the T-shaped portion of the cam in a manner similar to that described for the previous embodiment.

The operation of the embodiment of FIG. 2 is similar with the exception that the common combustion chamber 56 communicates with the cylinders of each rotor, it being understood that a pair of pistons 64 are in opposition at the time of firing so that the expansion stroke reacts upon both pistons which are at the combustion chamber location.

By the same token, exhaust and intake feed the cylinders of each rotor as they pass thereby.

Once again the cam rings 66 may be rotated slightly to alter the timing and the position of the cam rings relative to the end plates 51 may be varied by shims (not illustrated) or other similar means so that the compression ratio may be varied within limits.

Although both embodiments illustrate and describe opposed rotor assemblies within a common stator, nevertheless it will be appreciated that a single rotor can be used with a single cam ring and single cylinder head although, under these circumstances, it is desirable that the length of all strokes are equal in order to reduce vibration.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An internal combustion engine comprising, in combination, a hollow cylindrical stator including bearing plates located at each end thereof and a common cylinder head located intermediate the ends thereof to thereby define a first and second cylindrical chambers therein; ignition means located in said cylinder head; fuel and air inlet means and exhaust means located in said common cylinder head; first and second rotor members respectively disposed within said first and second stator chambers; means for journalling said rotors for rotation within the respective stator chambers; a cam ring for each said rotor mounted at one end of each of said stator chambers; said rotor means each comprising means defining a plurality of cylindrical bores having the axes thereof parallel to the axis of that rotor and disposed annularly around the axis of that rotor; a piston disposed for reciprocal motion in each of said bores of each of said rotors; means for operatively connecting said pistons of each rotor to the profile of the respective cam ring such that rotation of said rotors causes rotation of said connecting means around said cam ring profile to thereby control the reciprocal motion of said pistons within said bores; and a common combustion chamber formed in said common cylinder head so as to *be* brought into operative axial alignment with successive ones of the bores in both of said rotors during the rotation of said rotors, said common combustion chamber extending through said cylinder head with the axis thereof parallel to the axes of said rotors to provide direct permanent communication from one side thereof to the other and communicating with opposing bores of said rotors when brought to axial alignment therewith so as to provide simultaneous, common combustion between the pistons of said opposing bores, said common combustion chamber being operatively connected to said ignition means and being of such radial extent as to at least intermittently overlap two adjacent bores during rotation of said rotor thereby providing continuous combustion said air inlet means and said exhaust means being sequentially and operatively connected to said opposing bores from said common cylinder head.

2. The engine according to claim 1 in which the engagement of said means connecting said pistons with the profile of said cam rings provides, in 360° of travel of said rotor, an intake stroke, a compression stroke, an expansion stroke, and an exhaust stroke for each of said pistons.

3. The engine according to claim 2 in which said cam profile is such that the expansion and exhaust strokes of each of said pistons are longer than the intake and compression strokes thereof.

4. The engine according to claim 1 in which said cam profile is such that the expansion and exhaust strokes of each of said pistons are longer than the intake and compression strokes thereof.

5. The engine according to claim 1 further comprising means to rotate said cam rings, within limits, relative to said stator thereby advancing or retarding top dead center of said pistons relative to said ignition means.

6. An internal combustion engine; comprising, in combination, a hollow cylindrical stator including bearing plates located at each end thereof and a common cylinder head located intermediate the ends thereof to thereby define a first and second cylindrical chambers therein, ignition means located in said cylinder head, fuel and air inlet means and exhaust means located in said common cylinder head, first and second cylindrical rotors respectively disposed within said first and second stator chambers, means for journalling said rotors for rotation within the respective stator chambers, a cam ring for each said rotor mounted at one end of each of said stator chambers, a plurality of cylindrical bores formed in each said rotor with axes thereof parallel to the axis of that rotor and disposed annularly around the axis of the rotor, a piston disposed for reciprocal motion in each of said bores of each of said rotors, and means for operatively connecting said pistons of each rotor to the profile of the respective cam ring whereby rotation of said rotors causes rotation of said connecting means around said cam ring profile to thereby control the reciprocal motion of said piston within said bores, and a common combustion chamber formed in said common cylinder head so as to be brought into operative axial alignment with successive ones of the bores in each of said rotors during the rotation of said rotors, said common combustion chamber extending axially through said cylinder head to provide direct, permanent connection from one side to the other and communicating with opposing bores of said rotors when brought to axial alignment therewith so to provide simultaneous, common combustion between the pistons of said opposing bores and being operatively connected to said ignition means said air inlet means and said exhaust means being sequentially and operatively connected to said opposing bores from said common cylinder head.

7. The engine according to claim 6 in which said means connecting said pistons to said profile of said cam ring includes connecting rod means connected by one end thereof to said piston, and means for connecting the other end of said connecting rod means to said cam ring profile, said means for connecting said other end of said connecting rod means to said cam ring profile including said cam ring, said cam ring being of U-shaped cross section and including a base portion and a pair of spaced and parallel leg portions extending at right angles from said base portion, annular channels being formed on the inner surfaces of said leg portions, the side walls of said channels comprising bearing surfaces, first roller means being secured upon each side of said other end, and engaging one of said side walls, second roller means rolling in said annular channel and engaging the other of said side walls whereby said first and second roller means retain said other end of said connecting rod means in rolling engagement within said channels, said channels forming said cam ring profile.

8. The engine according to claim 6 in which said means connecting said pistons to said profile of said cam ring includes connecting rod means connected by one end thereof to said piston, and means for connecting the other end of said connecting rod means to said cam ring profile, said means for connecting said other end of said connecting rod means to said cam ring profile including said cam ring, said cam ring being of T-shaped cross section and including a web portion and a flange extending at right angles on each side of one edge of said web portion, a bifurcated end being formed on said other end of said connecting rod, first roller means being journalled within said bifurcated end and engaging the outer surface of said flanges, a pair of second roller means being journalled within said bifurcated end of said connecting rod spaced from said first roller means and engaging the inner surface of said flanges, one upon each side of said web portion.

9. The engine according to claim 6 in which said cam profile is such that the expansion and exhaust strokes of each of said pistons are longer than the intake and compression strokes thereof.

10. The engine according to claim 6 in which the engagement of said means connecting said pistons with the profile of said cam rings provides, in 360° of travel of said rotor, an intake stroke, a compression stroke, an expansion stroke, and an exhaust stroke for each of said pistons.

11. The engine according to claim 10 in which said cam profile is such that the expansion and exhaust strokes of each of said pistons are longer than the intake and compression strokes thereof.

12. The engine according to claim 6 which includes means to control the timing of the strokes of said pistons within limits.

13. The engine according to claim 12 in which said means includes timing control means to rotate said cam rings, within limits, relative to said stator thereby advancing or retarding top dead center of said pistons relative to said ignition means.

*14. An internal combustion engine comprising, in combination, a stator including bearing plates located at each end thereof and a common cylinder head to define a first and second cylindrical chamber, said common cylinder head circumferentially spanning at least a portion of said cylindrical chambers; fuel and air inlet means located on said stator; a shaft disposed within said first and second chambers; means for journalling said shaft for rotation within said chambers; a cam ring mounted at each end of said shaft and intermediate said bearing plates; two rotor members, each of said rotor members having a plurality of cylindrical bores disposed annularly around said rotor members; a piston disposed for reciprocal motion in each of said bores in each of said rotors; means for operatively connecting said pistons of each rotor to the profile of a cam ring such that rotation of said rotors causes rotation of said connecting means around said cam ring profile to thereby control the reciprocal motion of said pistons within said bores; and a common combustion chamber formed in said common cylinder head so as to be brought into operative axial alignment with successive ones of the bores in both of said rotors during the rotation of said rotors, said common combustion chamber extending through said cylinder head with the axis thereof parallel to the axes of said rotors to provide direct communication from one side thereof to the other and communicating with opposing bores of said rotors when brought to axial alignment therewith so as to provide common combustion between the pistons of said opposing bores, said common combustion chamber providing ignition by the intermittent overlapping of two adjacent bores during rotation of said rotor thereby providing continuous combustion said air inlet means and said exhaust means being sequentially and operatively connected to said opposing bores from said common cylinder head.*

*15. The engine according to claim 14 further comprising ignition means for initially or intermittently igniting said common combustion chamber.*

*16. The engine according to claim 15 further comprising means to rotate said cam rings, within limits, relative to said shaft member thereby advancing or retarding top dead center of said pistons relative to said ignition means.*

*17. The engine according to claim 15 in which the engagement of said means connecting said pistons with the profile of said cam rings provides, in 360° of travel of said*

*rotor, an intake stroke, a compression stroke, an expansion stroke, and an exhaust stroke for each of said pistons.*

*18. The engine according to claim 16 wherein cam profile is such that said expansion and exhaust strokes of each of said pistons are greater than 180° of travel in said 360° of travel and said intake and compression strokes are less than 180° of travel in said 360° of travel.*

*19. An internal combustion engine comprising:*

*(a) a substantially cylindrical stator, said stator having bearing plates disposed at each end thereof;*

*(b) a drive shaft, said drive shaft being rotatably mounted in said bearing plates;*

*(c) a rotor mounted to said drive shaft, said rotor having a plurality of cylindrical bores wherein each of said bores includes a piston disposed therein for reciprocal motion;*

*(d) a cam ring, said cam ring disposed intermediate said bearing plates and adjustably secured with respect to said stator wherein said cam ring is adjustably secured by a gear mounted on said stator communicating with said cam ring to annularly rotate said cam ring;*

*(e) means for operatively connecting said pistons disposed in said rotor to the profile of said cam ring;*

*(f) fuel and air inlet means disposed on said stator, said fuel and air inlet means intermittently communicating with said cylindrical bores; and*

*(g) a common combustion chamber disposed intermediate said bearing plates wherein said common combustion chamber is of such an angular extent as to overlap two cylindrical bores of said rotor to provide continuous combustion by flame propagation resulting from the intermittent overlapping and the initiation of combustion in each of said plurality of cylindrical bores as said pistons and cylinders rotate past said common combustion chamber.*

*20. The internal combustion engine of claim 19 further comprising an ignition means.*

*21. The internal combustion engine of claim 20 wherein said ignition means provides initial or intermittent combustion to said common combustion chamber.*

*22. The internal combustion engine of claim 19 further comprising exhaust means located on said stator.*

*23. The internal combustion engine of claim 19 wherein said cylindrical bores have their axes substantially parallel to the axis of said rotor and are disposed annularly around the axis of said rotor.*

*24. An internal combustion engine comprising:*

*(a) a substantially cylindrical stator, said stator having bearing plates disposed at each end thereof;*

*(b) a drive shaft, said drive shaft being rotatably mounted in said bearing plates;*

*(c) a rotor mounted to said drive shaft, said rotor having a plurality of cylindrical bores wherein each of said bores includes a piston disposed therein for reciprocal motion;*

*(d) a cam ring, said cam ring disposed intermediate said bearing plates and adjustably secured with respect to said stator wherein said cam ring is adjustably secured by a first gear mounted on said stator communicating with said cam ring to annularly rotate said cam ring;*

*(e) means for operatively connecting said pistons disposed in said rotor to the profile of said cam ring;*

*(f) a second cam ring, said second cam ring disposed intermediate said bearing plates and adjustably secured with respect to said stator by a second gear mounted on said stator communicating with said second cam ring to annularly rotate said second cam ring and wherein said plurality of cylindrical bores includes a plurality of second pistons disposed in each of said plurality of cylindrical bores in a confronting relationship to said first piston and includes means for operatively connecting said second pistons to the profile of said second cam ring;*

*(g) fuel and air inlet means disposed on said stator; and*

*(h) a common combustion chamber disposed intermediate said bearing plates wherein said common combustion chamber is of such an angular extent as to overlap two cylindrical bores of said rotor to provide continuous combustion by intermittently overlapping said cylindrical bores as said pistons and cylinders rotate past said common combustion.*

*25. The internal combustion engine of claim 24 wherein said common combustion chamber is disposed intermediate said first and second pistons and wherein said common combustion chamber is of such an angular extent as to provide combustion to said confronting pistons and provide continuous combustion to axially adjacent pistons as said pistons and cylindrical bores rotate past said common combustion chamber.*

*26. The internal combustion engine of claim 24 further comprising a second rotor wherein said second rotor includes a plurality of cylindrical bores wherein each of said bores includes said plurality of second pistons disposed therein for reciprocal motion and wherein said second rotor is mounted to said drive shaft to provide a confronting disposition between said pistons in said first and said second rotor.*

*27. The internal combustion engine of claim 26 wherein said common combustion chamber is disposed intermediate said first and second rotors and wherein said common combustion chamber is of such an angular extent as to provide combustion to said confronting pistons.*

*28. An internal combustion engine comprising:*

*(a) a substantially cylindrical stator having bearing plates disposed at each end thereof;*

*(b) a drive shaft said drive shaft being rotatably mounted in said bearing plates.*

*(c) a rotor mounted to said drive shaft said rotor having a plurality of cylindrical bores wherein each of said bores includes a first piston and a second piston wherein said first and second piston are disposed in a confronting relationship;*

*(d) a first cam ring, said first cam ring disposed intermediate said bearing plates and adjustably secured with respect to said stator;*

*(e) a second cam ring said second cam ring disposed intermediate said bearing plates and adjustably secured with respect to said stator;*

*(f) a first means for operatively connecting said first piston disposed in said rotor to the profile of said first cam ring;*

*(g) a second means for operatively connecting said second piston disposed in said rotor to the profile of said second cam ring; and*

*(h) a common combustion chamber disposed in said stator intermediate said first and said second pistons and communicating means extending between said cylindrical bores and wherein said common combustion chamber is of such an angular extent as to overlap the distance between two cylindrical bores on one side of said rotor or the axial distance between two cylindrical bores on opposite sides of said rotor when said communicating means is of a diameter less than the diameter of said pistons so as to provide continuous combustion between said cylindrical bores as said*

*pistons and cylindrical bores rotate past said common combustion chamber.*

*29. The internal combustion engine of claim 28 further comprising fuel and air inlet means and exhaust means disposed on said stator.*

*30. The internal combustion engine of claim 29 further comprising ignition means for initiating combustion.*

*31. The internal combustion engine of claim 30 wherein said ignition means provides intermittent combustion.*

*32. An internal combustion engine comprising, in combination:*

*(a) a hollow cylindrical stator including bearing plates located at each end thereof and a common cylinder head located intermediate the ends thereof to thereby define first and second cylindrical chambers therein;*

*(b) ignition means located in said common cylinder head;*

*(c) fuel and air inlet means and exhaust means located on said common cylinder head;*

*(d) a rotor means disposed within said first and second stator chambers wherein said rotor means includes a plurality of cylindrical bores disposed annularly around the axis of said rotor;*

*(e) means for journalling said rotor means for rotation within the respective stator chambers;*

*(f) at least one piston disposed for reciprocal motion in each of said bores of said rotor means;*

*(g) at least one cam ring for said rotor means mounted intermediate said bearing plates;*

*(h) means for operatively connecting said pistons of said rotor means to the profile of said cam ring such that rotation of said rotor means causes rotation of said means for operatively connecting said pistons around said cam ring profile to thereby control the reciprocal motion of said pistons within said bores; and*

*(i) a common combustion chamber formed in said common cylinder head so as to be brought into operative axial alignment with successive ones of said bores of said rotor means during the rotation of said rotor means, said common combustion chamber extending through said common cylinder head with the axis thereof parallel to the axes of said rotor means to provide communication from one side thereof to the other and communicating with opposing bores of said rotor means which when brought to axial alignment therewith provides continuous ignition by a continuous flame propagation as said plurality of cylindrical bores rotate past said common combustion chamber, said fuel and air inlet means and said exhaust means being sequentially and operatively connected to said opposing bores from said common cylinder head.*

*33. The internal combustion engine of claim 32 wherein said plurality of cylindrical bores have their axis parallel to the axis of said rotor means.*

*34. The internal combustion engine of claim 32 in which the engagement of said means connecting said pistons with the profile of said cam rings provides, in 360° of travel of said rotor means, an intake stroke, a compression stroke, an expansion stroke, and an exhaust stroke for each of said pistons.*

*35. The internal combustion engine of claim 32 in which said profile of said cam ring is such that the expansion and exhaust strokes of each of said pistons are longer than the intake and compression strokes thereof.*

*36. The internal combustion engine of claim 34 in which said profile of said cam ring is such that the expansion and exhaust strokes of each of said pistons are longer than the intake and compression strokes thereof.*

*37. The internal combustion engine of claim 32 further comprising means to rotate said cam ring within limits, relative to said stator thereby advancing or retarding top dead center of said pistons relative to said common cylinder head.*

*38. An internal combustion engine comprising, in combination:*

*(a) a hollow cylindrical stator including bearing plates located at each end thereof and a common cylinder head located intermediate the ends thereof to thereby define first and second cylindrical chambers therein;*

*(b) fuel injection means located on said cylinder head;*

*(c) air inlet means and exhaust means located on said common cylinder head;*

*(d) first and second rotor means respectively disposed within said first and second cylindrical chambers, said first and second rotor means each comprising means defining a plurality of cylindrical bores having the axes thereof parallel to the axis of said first and second rotor means and disposed annularly around the axis of said first and second rotor means;*

*(e) means for journalling said first and second rotor means for rotation within the respective cylindrical chambers;*

*(f) a cam ring for each of said first and second rotor means mounted at each end of said first and second cylindrical chambers;*

*(g) at least one piston disposed for reciprocal motion in each of said bores of each of said first and second rotor means;*

*(h) means for operatively connecting said pistons of each of said first and second rotor means to the profile of the respective cam ring such that rotation of said first and second rotor means causes rotation of said means for operatively connecting said pistons of said first and second rotor means to the profile of said respective cam ring to thereby control the reciprocal motion of said pistons within said bores; and*

*(i) a common combustion chamber formed in said common cylinder head so as to be brought into operative axial alignment with successive ones of the bores in each of said rotors during the rotation of said first and second rotor means, said common combustion chamber extending through said common cylinder head with the axis thereof parallel to the axes of said first and second rotor means to provide direct permanent communication from one side thereof to the other and communicating with opposing bores of said first and second rotor means when brought to axial alignment therewith so as to provide simultaneous, combustion between the pistons of said opposing bores, said common combustion chamber operating as ignition means and being of such angular extent as to at least intermittently overlap two adjacent bores during rotation of said first and second rotor means thereby providing continuous flame propagation, said air inlet means and said exhaust means being sequentially and operatively connected to said opposing bores from said common cylinder head.*

*39. The internal combustion engine of claim 38 in which the engagement of said means for operatively connecting said pistons with the profile of said cam rings provides, in 360° of travel of said rotor, an intake stroke, a compression stroke, an expansion stroke, and an exhaust stroke for each of said pistons.*

*40. The internal combustion engine of claim 38 in which said profile of said respective cam ring is such that the*

*expansion and exhaust strokes of each of said pistons are longer than the intake and compression strokes thereof.*

*41. The internal combustion engine of claim 39 in which said cam profile is such that the expansion and exhaust strokes of each of said pistons are longer than the intake and compression strokes thereof.*

*42. The internal combustion engine of claim 38 further comprising means to rotate said cam rings, within limits, relative to said stator thereby advancing or retarding top dead center of said pistons relative to said ignition means.*

*43. An internal combustion engine, comprising, in combination:*

*(a) a hollow cylindrical stator including bearing plates located at each end thereof and a common cylinder head located intermediate the ends thereof to thereby define first and second cylindrical chambers therein;*

*(b) ignition means located on said common cylinder head fuel and air inlet means and exhaust means located on said common cylinder head;*

*(c) a first and second cylindrical rotor respectively disposed within said first and second cylindrical chambers, means for journalling said rotors for rotation within said first and second cylindrical chambers;*

*(d) a cam ring for each of said rotors mounted at each end of said cylindrical chambers;*

*(e) a plurality of cylindrical bores formed in each of said rotors with axes thereof parallel to the axis of said rotors and disposed annularly around the axis of said rotors;*

*(f) a piston disposed for reciprocal motion in each of said bores of each of said rotors;*

*(g) means for operatively connecting said pistons of each rotor to the cam ring profile of each rotor whereby rotation of said rotors causes rotation of said connecting means around said cam ring profile to thereby control the reciprocal motion of said piston within said bore; and*

*(h) a common combustion chamber formed in said common cylinder head so as to be brought into operative axial alignment with successive bores in each of said rotors during the rotation of said rotors, said common combustion chamber extending axially through said common cylinder head to provide connection from one side to the other and communicating with opposing bores of said rotors when brought to axial alignment therewith so as to provide continuous ignition by flame propagation between the pistons of said opposing bores by an intermittent overlapping thereof said common combustion chamber being operatively connected to said ignition means, said fuel and air inlet means and said exhaust means being sequentially and operatively connected to said opposing bores from said common cylinder head.*

*44. The internal combustion engine of claim 43 in which said means connecting said pistons to said profile of said cam ring includes connecting rod means connected by one end thereof to said piston, and means for connecting the other end of said connecting rod means to said cam ring profile, said means for connecting said other end of said connecting rod means to said cam ring profile including said cam ring, said cam ring being of U-shaped cross section and including a base portion and a pair of spaced and parallel leg portions extending at right angles from said base portion, annular channels being formed on the inner surfaces of said leg portions, the side walls of said channels comprising bearing surfaces, first roller means being secured upon each side of said other end, and engaging one of said side walls, second roller means rolling in said annular channel and engaging the other end of said side walls whereby said first and second roller means retain said other end of said connecting rod means in rolling engagement within said channels, said channels forming said cam ring profile.*

*45. The internal combustion engine of claim 43 in which said means connecting said pistons to said profile of said cam ring includes connecting rod means connected by one end thereof to said piston, and means for connecting the other end of said connecting rod means to said cam ring profile, said means for connecting said other end of said connecting rod means to said cam ring profile including said cam ring, said cam ring being of T-shaped cross section and including a web portion and a flange extending at right angles on each side of one edge of said web portion, a bifurcated end being formed on said other end of said connecting rod, first roller means being journalled within said bifurcated end and engaging the outer surface of said flanges, a pair of second roller means being journalled within said bifurcated end of said connecting rod spaced from said first roller means and engaging the inner surface of said flanges, one upon each side of said web portion.*

*46. The internal combustion engine of claim 43 which includes means to control the timing of the strokes of said pistons within limits.*

*47. The internal combustion engine of claim 46 in which said means to control timing includes means to rotate said cam rings, within limits, relative to said stator thereby advancing or retarding top dead center of said pistons relative to said ignition means.*

*48. An internal combustion engine, comprising, in combination;*

*(a) a hollow cylindrical stator including bearing plates located at each end thereof and a common cylinder head located intermediate the ends thereof to define first and second cylindrical chambers;*

*(b) fuel injection means located on said common cylinder head;*

*(c) air inlet means and exhaust means located on said common cylinder head;*

*(d) first and second cylindrical rotors respectively disposed within said first and second cylindrical chambers, means for journalling said rotors for rotation within said respective cylindrical chambers;*

*(e) a cam ring for each said first and second rotors mounted at one end of said cylindrical chambers, a plurality of cylindrical bores formed in each of said first and second rotors with the axes of said bores parallel to the axis of said rotors and disposed annularly around the axis of said rotor;*

*(f) a piston disposed for reciprocal motion in each of said bores of each of said rotors;*

*(g) means for operatively connecting said pistons of each rotor to the profile of the respective cam ring whereby rotation of said rotors causes rotation of said connecting means around said cam ring profile to thereby control the reciprocal motion of said piston within said bores; and*

*(h) a common combustion chamber formed in said common cylinder head so as to be brought into operative axial alignment with successive ones of the bores in each of said rotors during the rotation of said rotors, said common combustion chamber extending axially through said common cylinder head to provide direct, permanent connection from one side to the other and communicating with opposing bores of said rotors when brought to axial alignment therewith so as to*

*provide simultaneous combustion between the pistons of said opposing bores and being operatively connected to said ignition means, said fuel and air inlet means and said exhaust means being sequentially and operatively connected to said opposing bores from said common cylinder head.*

*49. The internal combustion engine of claim 48 in which said means connecting said pistons to said profile of said cam ring includes connecting rod means connected by one end thereof to said piston, and means for connecting the other end of said connecting rod means to said cam ring profile, said means for connecting said other end of said connecting rod means to said cam ring profile including said cam ring, said cam ring being of U-shaped cross section and including a base portion and a pair of spaced and parallel leg portions extending at right angles from said base portion, annular channels being formed on the inner surfaces of said leg portions, the side walls of said channels comprising bearing surfaces, first roller means being secured upon each side of said other end, and engaging one of said side walls, second roller means rolling in said annular channel and engaging the other of said side walls whereby said first and second roller means retain said other end of said connecting rod means in rolling engagement within said channels, said channels forming said cam ring profile.*

*50. The internal combustion engine of claim 48 in which said means connecting said pistons to said profile of said cam ring includes connecting rod means connected by one end thereof to said piston, and means for connecting the other end of said connecting rod means to said cam ring profile including said cam ring, said cam ring being of T-shaped cross section and including a web portion and a flange extending at right angles on each side of one edge of said web portion, a bifurcated end being formed on said other end of said connecting rod, first roller means being journalled within said bifurcated end and engaging the outer surface of said flanges, a pair of second roller means being journalled within said bifurcated end of said connecting rod spaced from said first roller means and engaging the inner surface of said flanges, one upon each side of said web portion.*

*51. The internal combustion engine of claim 48 which includes means to control the timing of the strokes of said pistons within limits.*

*52. The internal combustion engine of claim 51 in which said means to control the timing includes means to rotate said cam rings, within limits, relative to said stator thereby advancing or retarding top dead center of said pistons relative to said ignition means.*

*53. The internal combustion engine of claim 48 wherein said cam ring profile is of a configuration to provide an expansion and exhaust stroke of each piston longer than the intake and compression stroke.*

* * * * *